Oct. 11, 1927.

V. ROYLE 1,645,157

TUBING MACHINE

Filed June 5, 1924

Inventor
Vernon Royle
By his Attorneys

Patented Oct. 11, 1927.

1,645,157

UNITED STATES PATENT OFFICE.

VERNON ROYLE, OF PATERSON, NEW JERSEY.

TUBING MACHINE.

Application filed June 5, 1924. Serial No. 718,183.

This invention relates to improvements in tubing machines and, more particularly to the throat feed for supplying the stock to the machine.

An object of the invention is to provide means whereby the stock is fed to the under side as well as to the upper side of the screw or plodder in order to attain more uniformity in the feed or, rather, in the take in of the stock by the screw.

Another object consists in providing certain improvements in the form, construction and arrangement of the several parts whereby the above named and other objects may effectively be attained.

Figure 1:
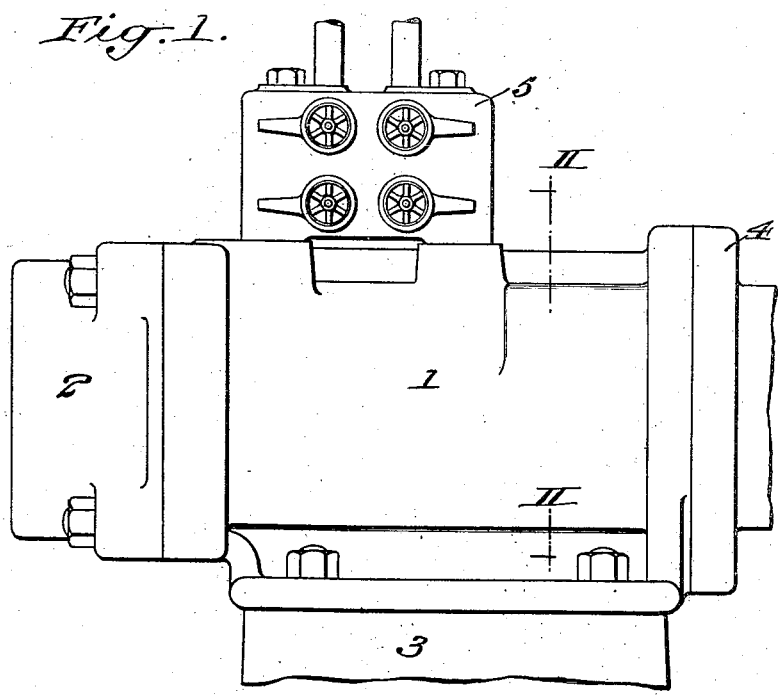

A practical embodiment of the invention is represented in the accompanying drawing, in which Fig. 1 represents a detail side elevation of that portion of a tubing machine which includes the throat feed together with adjacent parts.

Figure 2:
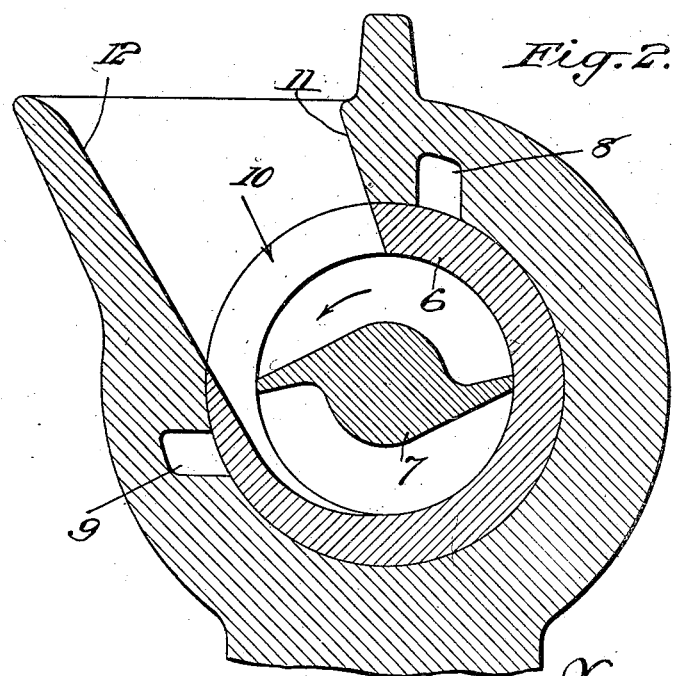

Fig. 2 represents an enlarged detail section taken in the plane of the line II—II of Fig. 1, looking to the right.

The stock which is commonly provided to tubing machines is in a somewhat plastic condition and, ordinarily, consists of rubber compound which is intended to be forced by the screw or plodder through a die of predetermined configuration in order to produce the desired article.

This plastic stock has heretofore been fed through an opening or channel, formed in the top portion of the cylinder that houses the screw, into immediate contact with the upper portion of the said screw, and the latter, in its rotation, has drawn or sucked in the stock and forced it along through the usual bore liner of the cylinder and out through the die in a well understood manner.

In this former practice, it has frequently happened that the uniformity of feed of the stock to the screw or the uniformity of its intake by the screw has varied with stocks of different consistency so as to, on occasion, cause the extrusion through the die of a product which has been defective, or, at least lacking in the desired degree of uniformity. For instance, it has been found that in stocks of a certain consistency, the edge of the screw would have a tendency to pinch the incoming stock against the wall of the cylinder bore liner and bite through or cut off a portion of the stock from that which follows. This action has taken place to a greater or less degree and, has frequently caused corresponding defects in the extruded product owing to lack of uniformity in the stock fed through the machines. Such defects or imperfections have consisted in irregularity in the thickness of the extruded product or in slight air pockets, fissures and the like.

My invention is calculated to eliminate any such irregularity or lack of uniformity in the feed or intake of the material, no matter what its consistency and, therefore, to prevent the ensuing imperfections in the product.

Referring to the form of the invention shown in the accompanying drawing, the cylinder is denoted by 1, the head which carries the die by 2, the standard for supporting the cylinder by 3, the rear housing of the screw by 4, and the chest for supplying heating or cooling medium to the head and cylinder by 5.

The bore liner for the cylinder is shown in Fig. 2 and marked 6, while the screw or plodder, which is also shown in said figure, is indicated by 7.

The reference numerals 8 and 9 represent channels for the heating or cooling medium.

The throat feed is marked 10 and it will be seen that it consists of a hopper-like portion projecting upwardly and laterally from the bore of the cylinder. It is open from the top of the cylinder down through the cylinder walls and also through the bore liner 6 so as to expose the screw or plodder 7.

By reference to the drawing it will be seen that the more vertical wall of the throat feed, which is marked 11, extends from the top of the cylinder down to a point substantially vertically above the axis of the screw 7.

The other wall of the throat feed, which is marked 12, extends downwardly and inwardly to a point on the inner face of the bore liner 6 which is substantially vertically below the axis of the screw.

In other words, the inner terminus of the wall 11 and the inner terminus of the wall 12 are substantially diametrically opposed in a vertical direction on the inner surface of the bore liner 6.

The wall 12 of the throat feed, as is evident from the drawing, passes down at one side of and below the screw 7 at a sufficient distance from the axis of the latter so as to leave a substantial space between the outer edge of the screw and the said wall 12.

The stock is, of course, fed in through the throat feed 10, as indicated by the arrow, and, owing to the shape and size of the said throat feed, the stock will not only be fed onto the top of the screw 7, but will also be fed around and under the said screw by reason of the shape and location of the wall 12. Thus the stock will get thoroughly in under the downwardly moving edge of the screw, the direction of rotation of which is indicated by an arrow, before there is any chance for the screw edge to bite or pinch the advanced portion of the stock from the remainder. This ensures a constant and uniform feed of the stock to the screw with the result of obviating the above described defects in the product, thereby adapting the tubing machine for constant satisfactory operation with stocks varying decidedly in their consistency.

While, as described, I have shown the inner termini of the walls 11 and 12 as diametrically opposed in a vertical direction, such an arrangement is not essential to my invention. The point is to have the wall 12 arranged so as to permit a substantial portion of the stock to be fed beneath the downwardly traveling adjacent edge of the screw.

It will be understood that various changes may be resorted to in the form construction and arrangement of the several parts without departing from the spirit and scope of my invention; and hence, I do not intend to be limited to the details herein shown and described, except as they may be included in the claims.

What I claim is:—

1. In a tubing machine comprising a screw and a housing with a bore therein, a feed opening formed in the housing, one wall of said opening slanting downwardly and inwardly from a point above and to one side of the screw and developing into a curve at its lower end, which curve merges into the bore at substantially the lowest part of the screw without abrupt change of direction.

2. In a tubing machine comprising a screw and a housing therefor, a feed opening formed in the housing, one wall of said feed opening inwardly inclined and terminating at the top of said screw and the other wall of said feed opening inclined and terminating in a curve at the bottom of the screw, the inner termini of said walls being spaced apart a distance substantially equal to the diameter of the screw.

3. In a tubing machine comprising a screw and a housing therefor, a feed opening formed in the housing, one wall of said feed opening having a curved portion passing below the axis of the screw at a distance from the axis of the screw greater than the distance of the edge of the screw from its axis, said curved portion gradually approaching the axis toward the bottom of the screw as it progresses below said axis.

4. In a tubing machine comprising a screw and a housing therefor, a feed opening having a curved portion formed in the housing, one wall of said feed opening passing below the axis of the screw at a distance from the axis of the screw greater than the distance of the edge of the screw from its axis, said curved portion gradually approaching the axis of the screw as it progresses below said axis toward the bottom of the screw until it terminates at a distance from said axis substantially equal to the distance of the edge of the screw from its axis.

5. In a tubing machine comprising a screw and a housing therefor, a feed opening formed in the housing, one wall of said feed opening passing below the axis of the screw at a distance from the axis of the screw greater than the distance of the edge of the screw as it progresses below said axis toward the bottom of the screw until it terminates at a distance from said axis substantially equal to the distance of the edge of the screw from its axis, said point of termination being substantially vertically below the axis of the screw.

6. In a tubing machine comprising a screw and a housing therefor, a feed opening formed in the housing, one wall of said feed opening passing below the axis of the screw at a distance from the axis of the screw greater than the distance of the edge of the screw as it progresses below said axis toward the bottom of the screw until it terminates at a distance from said axis substantially equal to the distance of the edge of the screw from its axis, said point of termination being substantially vertically below the axis of the screw, and the other wall of said feed opening inwardly inclined and terminating at a point substantially vertically above the axis of the screw.

7. In a tubing machine comprising a screw and a housing therefor, a feed opening formed in the housing, one wall of said feed opening passing below the axis of the screw at a distance from the axis of the screw greater than the distance of the edge of the screw as it progresses below said axis toward the bottom of the screw until it terminates at a distance from said axis substantially equal to the distance of the edge of the screw from its axis, said point of termination being substantially vertically below the axis of the screw, and the other wall of said feed opening inwardly inclined and terminating at a point substantially vertically above the axis of the screw and at a distance from said axis substantially equal to the distance of the edge of the screw from its axis.

In testimony, that I claim the foregoing as my invention, I have signed my name this 2d day of June, 1924.

VERNON ROYLE.